(12) United States Patent
Jung (10) Patent No.: US 11,491,977 B2
(45) Date of Patent: Nov. 8, 2022

(54) DRIVER ASSISTANCE SYSTEM AND METHOD OF CONTROLLING THE SAME

(71) Applicant: MANDO CORPORATION, Pyeongtaek-si (KR)

(72) Inventor: Soo Myung Jung, Seoul (KR)

(73) Assignee: HL Klemove Corp., Incheon (KR)

( * ) Notice: Subject to any disclaimer, the term of this patent is extended or adjusted under 35 U.S.C. 154(b) by 204 days.

(21) Appl. No.: 16/898,863

(22) Filed: Jun. 11, 2020

(65) Prior Publication Data
US 2020/0391734 A1 Dec. 17, 2020

(30) Foreign Application Priority Data
Jun. 11, 2019 (KR) .................. 10-2019-0068777

(51) Int. Cl.
*B60W 30/095* (2012.01)
*B60W 30/09* (2012.01)
(Continued)

(52) U.S. Cl.
CPC .......... *B60W 30/095* (2013.01); *B60W 10/18* (2013.01); *B60W 10/30* (2013.01); *B60W 30/09* (2013.01); *B60W 2420/42* (2013.01); *B60W 2420/52* (2013.01); *B60W 2420/54* (2013.01); *B60W 2510/1005* (2013.01); *B60W 2540/10* (2013.01); *B60W 2540/106* (2013.01);
(Continued)

(58) Field of Classification Search
CPC ............... B60W 30/095; B60W 30/09; B60W 2420/42; B60W 2420/52; B60W 2420/54; B60W 2510/1005; B60W 2540/10; B60W 2540/16; B60W 2554/4029; B60W 2554/80; B60W 2554/802; B60W 30/08; B60W 10/18; B60W 10/30; B60W 2540/106; B60K 31/0008; B60T 2201/022
See application file for complete search history.

(56) References Cited

U.S. PATENT DOCUMENTS

2005/0040983 A1* 2/2005 Madau ............... B60K 31/0008
342/107
2010/0023234 A1* 1/2010 Kameyama ........... B60W 30/08
701/1
(Continued)

FOREIGN PATENT DOCUMENTS

KR    20210117472 A   *   2/2021

*Primary Examiner* — Roger L Pang
(74) *Attorney, Agent, or Firm* — Morgan, Lewis & Bockius LLP (57) ABSTRACT

A driver assistance system includes a detector configured to detect pedestrians or obstacles in a front detection area and a rear detection area of a vehicle; an accelerator pedal sensor configured to detect a position of an accelerator pedal of the vehicle; and a controller configured to selectively activate the front detection area and the rear detection area according to a gear state of the vehicle, when there is the pedestrians or the obstacles in the activated detection area, to recognize an acceleration pedal change amount from an acceleration pedal position detected through the accelerator pedal sensor, to determine whether emergency braking of the vehicle is necessary based on the recognized acceleration pedal change amount, and when the emergency braking is necessary, to perform the emergency braking for the vehicle.

15 Claims, 10 Drawing Sheets

(51) Int. Cl.
*B60W 10/30* (2006.01)
*B60W 10/18* (2012.01)
(52) U.S. Cl.
CPC . *B60W 2540/16* (2013.01); *B60W 2554/4029* (2020.02); *B60W 2554/80* (2020.02)

(56) References Cited

U.S. PATENT DOCUMENTS

| | | | |
|---|---|---|---|
| 2014/0025267 A1* | 1/2014 | Tezuka | B60W 30/18027 |
| | | | 701/51 |
| 2017/0174211 A1* | 6/2017 | Mizoguchi | B60W 10/06 |
| 2017/0197616 A1* | 7/2017 | Ichikawa | G01S 7/524 |
| 2019/0009775 A1* | 1/2019 | Ito | B60W 30/085 |
| 2021/0370780 A1* | 12/2021 | Cho | B60L 15/2009 |

* cited by examiner

DRIVER ASSISTANCE SYSTEM AND METHOD OF CONTROLLING THE SAME

CROSS-REFERENCE TO RELATED APPLICATION(S)

This application is based on and claims priority under 35 U.S.C. § 119 to Korean Patent Application No. 10-2019-0068777, filed on Jun. 11, 2019 in the Korean Intellectual Property Office, the disclosure of which is incorporated by reference in its entirety.

TECHNICAL FIELD

The disclosure relates to a driver assistance system and a method of controlling the same, and more particularly, to a driver assistance system capable of reducing a risk of collision between a host vehicle and a surrounding vehicle, and a method of controlling the same.

BACKGROUND

In general, when a driver presses on an accelerator pedal in a state where a gear is changed to R stage or D stage differently from a direction in which the driver intends to proceed in a stopped state, a front collision or a rear collision may occur due to insufficient driver's attention.

The driver intended to move a parked vehicle in a forward direction, but when the accelerator pedal is pressed while the gear is incorrectly moved from P stage to the R stage instead of the D stage, a host vehicle may collide with a parked rear vehicle because the host vehicle moves in a reverse direction rather than the driver's intended forward direction.

In addition, the driver intended to move the parked vehicle in the reverse direction, but when the accelerator pedal is pressed while the gear is incorrectly moved from the P stage to the D stage instead of the R stage, the host vehicle may collide with the parked rear vehicle because the host vehicle moves in the forward direction rather than the driver's intended reverse direction.

As described above, when the host vehicle drives in a direction not intended by the driver due to the driver's gear manipulation mistake when starting after stopping, the host vehicle may collide with surrounding vehicles.

SUMMARY

An aspect of the disclosure is to provide a driver assistance system capable of preventing a collision between a host vehicle and a pedestrian or an obstacle even if the host vehicle drives in a direction not intend by a driver due to a drivers gear manipulation mistake when starting after stopping, and a method of controlling the driver assistance system.

Additional aspects of the disclosure will be set forth in part in the description which follows and, in part, will be obvious from the description, or may be learned by practice of the disclosure.

In accordance with an aspect of the disclosure, a driver assistance system includes a detector configured to detect pedestrians or obstacles in a front detection area and a rear detection area of a vehicle; an accelerator pedal sensor configured to detect a position of an accelerator pedal of the vehicle; and a controller configured to selectively activate the front detection area and the rear detection area according to a gear state of the vehicle, when there is the pedestrians or the obstacles in the activated detection area, to recognize an acceleration pedal change amount from an acceleration pedal position detected through the accelerator pedal sensor, to determine whether emergency braking of the vehicle is necessary based on the recognized acceleration pedal change amount, and when the emergency braking is necessary, to perform the emergency braking for the vehicle.

The controller may be configured to: when a distance between the pedestrians or the obstacles and a host vehicle existing in the activated detection area is within a preset distance, recognize an acceleration pedal amount and an acceleration pedal change rate from the acceleration pedal position detected through the accelerator pedal sensor; and determine whether the emergency braking of the vehicle is necessary based on the recognized acceleration pedal amount and acceleration pedal change rate.

When the recognized acceleration pedal amount is higher than a preset pedal amount and the recognized acceleration pedal change rate is higher than a preset change rate, the controller may be configured to determine that the emergency braking of the vehicle is necessary.

The controller may be configured to activate the front detection area when the gear state is a forward gear stage, and to activate the rear detection area when the gear state is a reverse gear stage.

The detector may include a front ultrasonic sensor configured to detect a distance to the pedestrians or the obstacles in the front detection area, and a rear ultrasonic sensor configured to detect a distance to the pedestrians or the obstacles in the rear detection area.

The detector may include at least one of an image sensor, a radar sensor, or a LiDAR sensor.

In accordance with another aspect of the disclosure, a driver assistance system includes a front ultrasonic sensor configured to detect a distance to pedestrians or obstacles in a front detection area of a vehicle; a rear ultrasonic sensor configured to detect the distance to the pedestrians or the obstacles in a rear detection area of the vehicle; an accelerator pedal sensor configured to detect a position of an accelerator pedal of the vehicle; and a controller configured to selectively activate the front detection area and the rear detection area according to a gear state of the vehicle, to recognize the distance of the pedestrian or the obstacle based on the distance to the pedestrian or the obstacle output from the ultrasonic sensor corresponding to the activated detection area, when the recognized distance of the pedestrian or the obstacle is within a preset distance, to recognize an acceleration pedal amount and an acceleration pedal change rate from an acceleration pedal position output from the accelerator pedal sensor, to determine whether emergency braking of the vehicle is necessary based on the recognized acceleration pedal amount and acceleration pedal change rate, and when the emergency braking is necessary, to perform the emergency braking for the vehicle.

In accordance with another aspect of the disclosure, a method of controlling a driver assistance system includes receiving a gear state of a vehicle; selectively activating a front detection area and a rear detection area of the vehicle according to the received gear state; recognizing a distance of pedestrians or obstacles in the activated detection area based on at least one of ultrasonic data, image data, radar data, and LiDAR data respectively, received from at least one of an ultrasonic sensor, an image sensor, a radar sensor, or a LiDAR sensor provided in the vehicle; determining whether the distance of the recognized pedestrians or obstacles is within a preset distance; when the recognized distance of the pedestrians or obstacles is within the preset distance, recognizing an acceleration pedal change amount from an acceleration pedal position output from an accelerator pedal sensor provided in the vehicle; determining whether emergency braking of the vehicle is necessary based on the recognized acceleration pedal change amount; and when the emergency braking is required, performing the emergency braking for the vehicle.

The determining whether the emergency braking of the vehicle is necessary may include when the recognized acceleration pedal amount is higher than a preset pedal amount and the recognized acceleration pedal change rate is higher than a preset change rate, determining that the emergency braking of the vehicle is necessary.

The selectively activating of the detection area may include when the gear state is a forward gear stage, activating the front detection area; and when the gear state is a reverse gear stage, activating the rear detection area.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numerals refer to like elements throughout the specification. Not all elements of the embodiments of the disclosure will be described, and the description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network. The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise. Reference numerals used for method steps are merely used for convenience of explanation, but not to limit an order of the steps. Thus, unless the context clearly dictates otherwise, the written order may be practiced otherwise.

Figure 1:
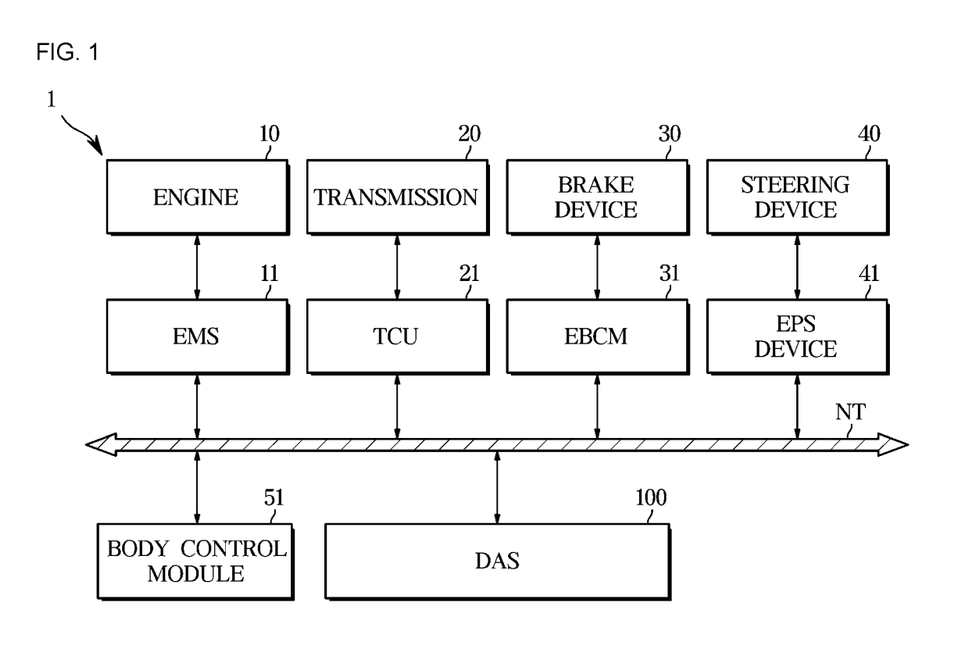
FIG. 1 is a block diagram illustrating a configuration of a vehicle to which a driver assistance system is applied according to an embodiment.

FIG. 1 is a block diagram illustrating a configuration of a vehicle to which a driver assistance system is applied according to an embodiment.

Referring to FIG. 1, a vehicle 1 may include an engine 10, a transmission 20, a braking device 30, and a steering device 40. The engine 10 may include a cylinder and a piston, and may generate power for the vehicle 1 to drive. The transmission 20 may include a plurality of gears, and may transmit power generated by the engine 10 to wheels. The braking device 30 may decelerate or stop the vehicle 1 through friction with the wheels. The steering device 40 may change a driving direction of the vehicle 1.

The vehicle 1 may include a plurality of electronic components. For example, the vehicle 1 further includes an engine management system (EMS) 11, a transmission control unit (TCU) 21, and an electronic brake control module (EBCM) 31), an electronic power steering (EPS) 41, a body control module (BCM), and a driver assistance system (DAS).

The EMS 11 may control the engine 10 in response to acceleration intent of the driver through an accelerator pedal or a request of the DAS 100. For example, the EMS 11 may control torque of the engine 10.

The TCU 21 may control the transmission 20 in response to a shift command of the driver through a shift lever adjusting gear stages such as D, N, R, and P stages and/or a driving speed of the vehicle 1. For example, the TCU 21 may adjust the gear ratio from the engine 10 to the vehicle wheels.

The EBCM 31 may control the braking device 30 in response to a braking intent of the driver through a braking pedal and/or a slip of the vehicle wheels. For example, the EBCM 31 may be an anti-lock braking systems (ABS) capable of temporarily releasing the braking of the vehicle wheel in response to a slip of the vehicle wheel detected at a time of braking of the vehicle 1. The EBCM 31 may be an electronic stability control (ESC) capable of selectively releasing braking of the vehicle wheel in response to over-steering and/or under-steering sensed at a time of steering of the vehicle 1. In addition, the EBCM 31 may be a traction control system (TCS) capable of temporarily braking the vehicle wheels in response to a slip of the vehicle wheel sensed at a time of driving of the vehicle 1.

The EPS 41 may assist the operation of the steering device 40 so that the driver easily manipulates the steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

When the vehicle 1 starts after stops, if there is a pedestrian and/or obstacle in a detection area according to a gear state among a front detection area and a rear detection area of the vehicle 1, the DAS 100 may determine whether an emergency braking of the vehicle 1 according to an accelerating intent of the driver, and may warn the driver or perform the emergency braking of the vehicle 1 according to the determination result. Particularly, when the pedestrian and/or the obstacle is present in the detection area, the DAS 100 may recognize an accelerator pedal change amount from an acceleration pedal position detected by an accelerator pedal sensor, and may determine whether the emergency braking of the vehicle 1 is necessary based on the recognized the accelerator pedal change amount. When the emergency braking is required, the DAS 100 may the emergency braking the vehicle 1.

Accordingly, the DAS 100 may prevent a collision between the host vehicle and the pedestrian or the obstacle even if the host vehicle drives in a direction not intended by the driver due to the driver's gear manipulation mistake.

The DAS 100 may include forward collision avoidance (FCA), emergency braking system (AEB), lane departure warning (LDW), lane keeping assist (LKA), smart parking assist system (SPAS), driver attention warning (DAW), smart cruise control (SCC), and blind spot detection (BSD), and the like.

The above described electronic components may communicate with each other through vehicle communication network (NT). For example, the electronic components may exchange data therebetween through Ethernet, media oriented systems transport (MOST), Flexray, controller area network (CAN), local interconnect network (LIN), and the like. For example, the DAS 100 may receive a gear status signal from the TCU 21 through the NT. The ADAS 100 may transmit a driving control signal, a braking signal, and a steering signal to the EMS 11, the EBCM 31, and the EPS 41, respectively, through the NT.

Figure 2:
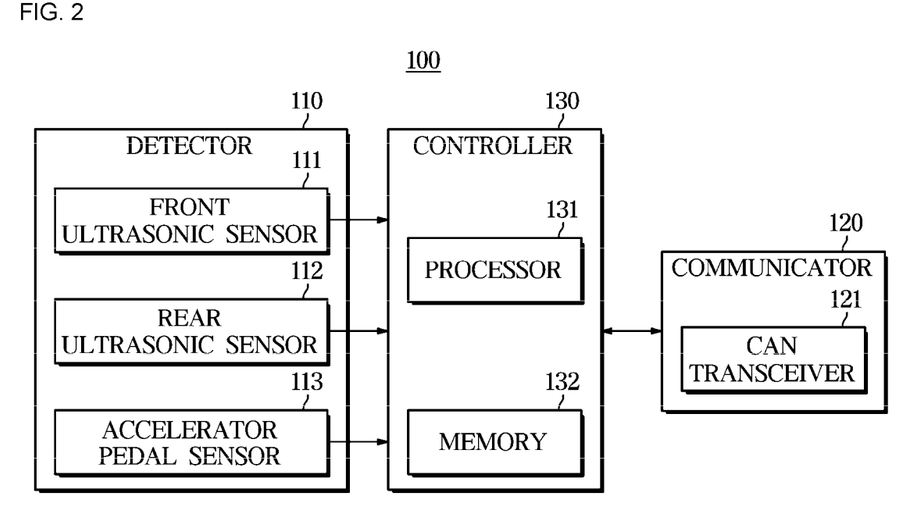
FIG. 2 is a block diagram illustrating a configuration of a driver assistance system according to an embodiment.

FIG. 2 is a block diagram illustrating a configuration of a driver assistance system according to an embodiment.

Referring to FIG. 2, the DAS may include a detector 110 for detecting pedestrians and/or obstacles, and a communicator 120 for communicating with other electronic components 11, 21, 31, 41, and 51 included in the vehicle 1, and a controller 130 for determining whether the vehicle 1 is braking based on an output of the detector 110.

The detector 110 may include a front ultrasonic sensor 111, a rear ultrasonic sensor 112, and an accelerator pedal sensor 113.

Figure 3:
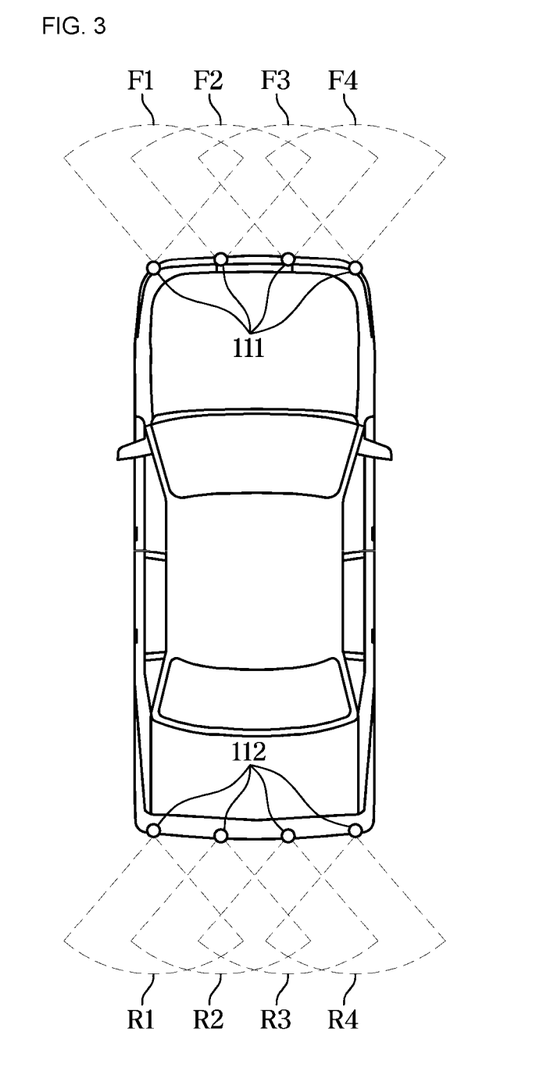
FIG. 3 is a view illustrating a plurality of ultrasonic sensors included in a driver assistance system according to an embodiment.

Referring to FIG. 3, the front ultrasonic sensor 111 may include four ultrasonic sensors provided in front of the vehicle 1. The front ultrasonic sensor 111 may be disposed to be spaced a preset distance from a front bumper of the vehicle 1 so as to cover an entire front area of the vehicle 1, such as the center front, left front, and right front sides of the vehicle 1.

The rear ultrasonic sensor 112 may include four ultrasonic sensors provided at the rear of the vehicle 1. The rear ultrasonic sensor 112 may be disposed to be spaced a preset distance from a rear bumper of the vehicle 1 so as to cover an entire rear area of the vehicle 1, such as the center rear, left rear, and right rear sides of the vehicle 1.

The front ultrasonic sensor 111 and the rear ultrasonic sensor 112 are installed at predetermined intervals on the front bumper or rear bumper of the vehicle 1, respectively, but the positions in which the front ultrasonic sensor 111 and the rear ultrasonic sensor 112 are installed are not limited to this, and if it is possible to cover the entire area of the rear of the vehicle, such as the front/rear of the center, the front/rear of the left side, and the front/rear of the right side, it is possible to be installed at different heights at irregular intervals.

The front ultrasonic sensor 111 may have a plurality of front detection areas F1, F2, F3, and F4 to detect the pedestrians and/or the obstacles in the front. The front detection areas F1, F2, F3, and F4 may overlap each other.

The rear ultrasonic sensor 112 may have a plurality of rear detection areas R1, R2, R3, and R4 to detect the pedestrians and/or the obstacles in the rear. The rear detection areas R1, R2, R3, and R4 may overlap each other.

The front ultrasonic sensor 111 and the rear ultrasonic sensor 112 may transmit ultrasonic waves for detecting the pedestrians and/or the obstacles, and may receive the ultrasonic waves reflected from the pedestrians and/or the obstacles. The controller 130 may determine a distance between the front ultrasonic sensor 111 and the pedestrians and/or the obstacles, or may determine a distance between the rear ultrasonic sensor 112 and the pedestrians and/or the obstacle using a phase or time difference between the transmitted ultrasonic wave and the reflected ultrasonic wave.

Figure 4:
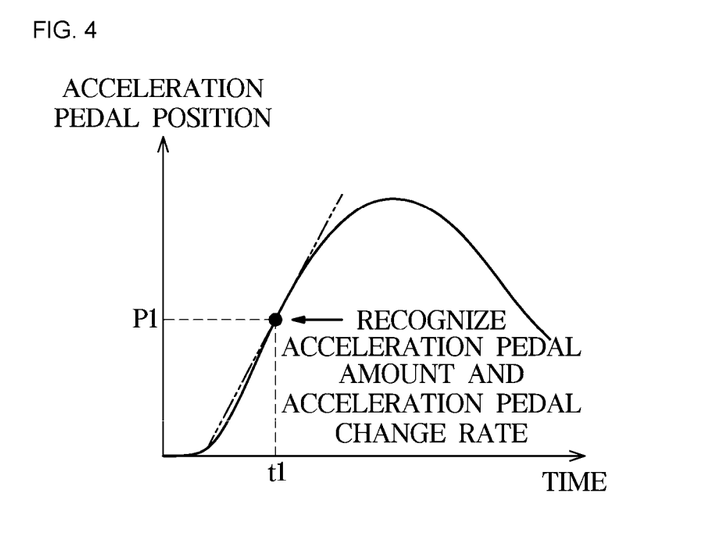
FIG. 4 is a view illustrating an example of recognizing an acceleration pedal amount and an acceleration pedal change rate in a driver assistance system according to an embodiment.

The accelerator pedal sensor 113 may be mounted on the accelerator pedal to detect a position of the accelerator pedal. As illustrated in FIG. 4, the controller 130 may recognize the acceleration pedal amount and the acceleration pedal change rate according to the position of the accelerator pedal. When the driver presses the accelerator pedal momentarily and deeply, the acceleration pedal amount may increase and the acceleration pedal change rate may increase. In this case, the vehicle 1 may suddenly start.

The communicator 120 may include can transceiver 121 that receives the communication signal from the electronic components 11, 21, 31, 41, and 51 through the NT and transmits the communication signal to the electronic components 11, 21, 31, 41, and 51.

The can transceiver 121 may receive an analog communication signal through the NT, convert the analog communication signal to digital communication data through an A/D conversion circuit, and output the digital communication data to the controller 130. In addition, the can transceiver 121 may receive the digital communication data from the controller 130, convert the digital communication data into the analog communication signal through a D/A conversion circuit, and transmit the analog communication signal through the NT.

The controller 130 may include a processor 131 and a memory 132.

The processor 131 may process the output of the detector 110, and may control the communicator 120 to transmit a message requesting emergency braking of the vehicle 1 to the EBCM 31 based on the output of the detector 110.

The processor 131 may receive information related to a distance to the pedestrian and/or obstacle from the front ultrasonic sensor 111 and/or the rear ultrasonic sensor 112 by the detector 110. For example, the processor 131 may receive information about the phase/time difference between the transmitted ultrasonic waves and the reflected ultrasonic waves of the front ultrasonic sensor 111 or the rear ultrasonic sensor 112 from the detector 112, and may determine whether there are the pedestrians and/or the obstacles in the front detection areas F1, F2, F3, and F4 or the rear detection areas R1, R2, R3, and R4 based on the received information. When there are the pedestrians and/or the obstacles, the processor 131 may determine the distance from the ultrasonic sensor 111 or the rear ultrasonic sensor 112 to the pedestrians and/or the obstacles.

The processor 131 may receive the gear state of the shift lever from the TCU 21 through the can transceiver 121, and may selectively activate the front detection areas F1, F2, F3, and F4 or the rear detection areas R1, R2, R3, and R4 according to the received gear state to monitor the area to which the vehicle 1 moves.

For example, when the driver changes the shift lever of the vehicle 1 from the P stage to the D stage, which is a forward gear stage, in order to drive the stopped vehicle 1, the processor 131 may receive the changed gear state (P stage→D stage) from the TCU 21 through the can transceiver 121, and may activate the front detection areas F1, F2, F3, and F4 because the received gear state is the forward gear stage. When the driver changes the shift lever of the vehicle 1 from the P stage to the R stage, which is a reverse gear stage, in order to drive the stopped vehicle 1, the processor 131 may receive the changed gear state (P stage→R stage) from the TCU 21 through the can transceiver 121, and may activate the rear detection areas R1, R2, R3, and R4 because the received gear state is the reverse gear stage.

When the pedestrian and/or the obstacle is present in the activated detection area, the processor 131 may recognize the acceleration pedal amount and the acceleration pedal change rate from the acceleration pedal position detected through the accelerator pedal sensor 113, and may determine whether the emergency braking of the vehicle 1 is necessary based on the recognized acceleration pedal amount and the acceleration pedal change rate. When the emergency braking is required, the processor may transmit the message requesting the emergency braking of the vehicle 1 to the EBCM 31 through the can transceiver 121 to emergency brake the vehicle 1.

When the acceleration pedal amount is higher than a preset pedal amount and the acceleration pedal change rate is higher than a preset change ratio, the processor 131 may determine that the emergency braking is necessary.

In addition, when the obstacle exists in the activated detection area, the processor 131 may determine whether the distance between the host vehicle 1 and the pedestrian and/or the obstacle present in the activated detection area is within a preset distance. When it is within the preset distance, the processor 131 may recognize the acceleration pedal amount and acceleration pedal change rate from the acceleration pedal position detected through the accelerator pedal sensor 113, and may determine whether the emergency braking is necessary based on the recognized acceleration pedal amount and acceleration pedal change rate.

Meanwhile, the processor 131 may detect an acceleration pedal position through the accelerator pedal sensor 113 during stop, and recognize the acceleration pedal amount and the acceleration pedal change rate based on the acceleration pedal position detected through the accelerator pedal sensor 113. When the recognized acceleration pedal amount is higher than the preset pedal amount and the recognized acceleration pedal change rate is higher than the preset change rate, the processor 131 may receive the gear state of the shift lever from the TCU 21 through the can transceiver 121, and selectively activate the front detection areas F1, F2, F3, and F4 or the rear detection areas R1, R2, R3, and R4 according to the received gear state. When there are the pedestrians and/or the obstacles in the detection area according to the gear state among the front detection areas F1, F2, F3, and F4 and the rear detection areas R1, R2, R3, and R4, the processor 131 may determine whether the distance between the host vehicle 1 and the pedestrians and/or the obstacles existing in the activated detection area is within the preset distance. when it is within the preset distance, the processor 131 may recognize the acceleration pedal amount and the acceleration pedal change rate from the acceleration pedal position detected through the accelerator pedal sensor 113, and may determine whether the emergency braking is necessary based on the recognized acceleration pedal amount and the acceleration pedal change rate.

The memory 132 may store a program and data for controlling the communicator 120 to process the output of the detector 110 and transmit the message requesting braking of the vehicle 1 to the EBCM 31 based on the output of the detector 110.

The memory 132 may temporarily store detecting data received from the front ultrasonic sensor 111, the rear ultrasonic sensor 112, and the accelerator pedal sensor 113, and temporarily store the processing result of the detecting data of the processor 131.

The memory 132 may not only include a volatile memory, such as an S-RAM, a D-RAM, and the like, but also include a non-volatile memory, such as a flash memory, a read only memory (ROM), an erasable programmable read only memory (EPROM), and the like.

Figure 5:
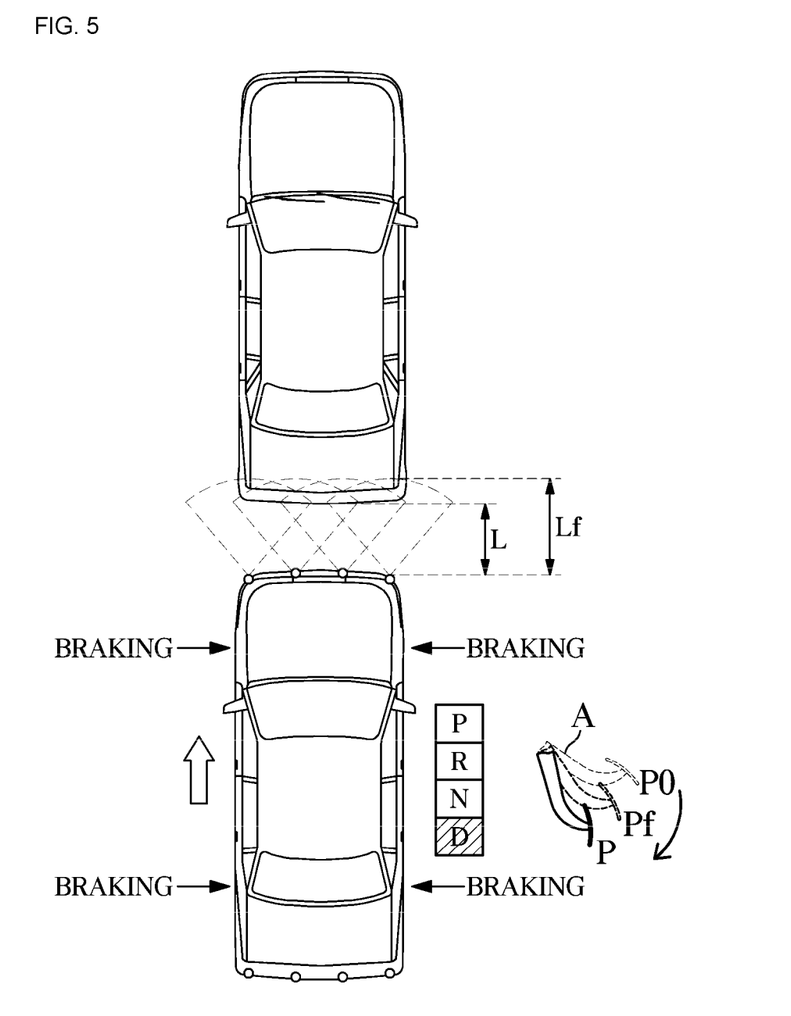
FIG. 5 is a view illustrating an example in which an accelerator pedal is strongly pressed in a state of gear D when starting after stopping in a driver assistance system according to an embodiment.

FIG. 5 is a view illustrating an example in which an accelerator pedal is strongly pressed in a state of gear D when starting after stopping in a driver assistance system according to an embodiment.

Referring to FIG. 5, when the shift lever of the vehicle 1 is changed from the P stage to the D stage, which is the forward gear stage when starting after stopping, the DAS 100 may activate the front detection areas F1, F2, F3, and F4 through the front ultrasonic sensor 111 and monitor the front detection areas F1, F2, F3, and F4. When there is the obstacle in the front detection areas F1, F2, F3, and F4, and a distance L of the obstacle is within a preset distance Lf, the DAS 100 may recognize the acceleration pedal amount and the acceleration pedal change rate are recognized from the acceleration pedal position detected through the accelerator pedal sensor 113. When the recognized acceleration pedal amount is higher than the preset pedal amount and the recognized acceleration pedal change rate is higher than the preset change rate, the DAS 100 may determine that the emergency braking is necessary and automatically brake each wheel of the vehicle 1. In this case, the preset pedal amount may be a pedal amount corresponding to a position change in which an accelerator pedal first moved from P0 to Pf. The preset change rate may be a change rate of a pedal amount where the accelerator pedal A changes position from P0 to Pf.

As described above, in the past, the driver intended to move the parked vehicle in the reverse direction, but when the accelerator pedal is pressed strongly when the gear is incorrectly moved from the P stage to the D stage instead of the R stage, sine the host vehicle 1 moves in the forward direction rather than the intended reverse direction, there is a possibility of collision with a parked front vehicle. The DAS 100 according to the embodiment may automatically brake the host vehicle 1 even if the host vehicle 1 does not pay attention due to driving in the direction not intended by the driver, thereby preventing collision between the host vehicle 1 and the front vehicle.

Figure 6:
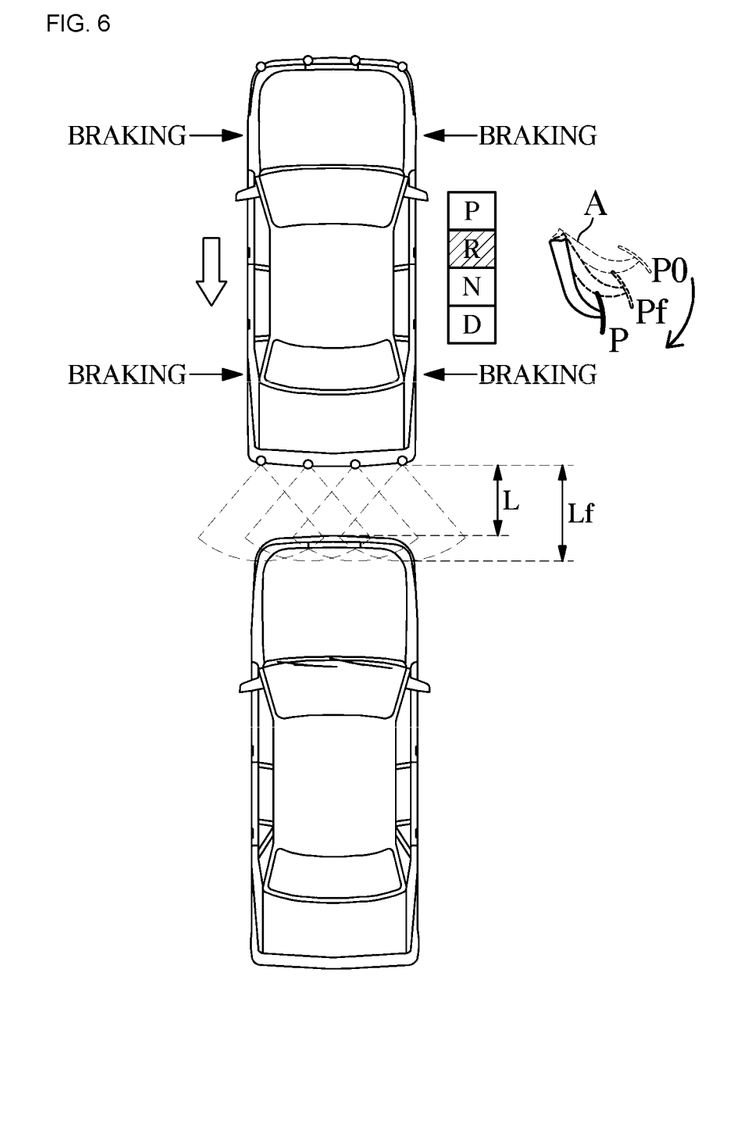
FIG. 6 is a view illustrating an example in which an accelerator pedal is strongly pressed in a state of gear R when starting after stopping in a driver assistance system according to an embodiment.

FIG. 6 is a view illustrating an example in which an accelerator pedal is strongly pressed in a state of gear R when starting after stopping in a driver assistance system according to an embodiment.

Referring to FIG. 6, when the shift lever of the vehicle 1 is changed from the P stage to the R stage, which is the reverse gear stage when starting after stopping, the DAS 100 may activate the rear detection areas R1, R2, R3, and R4 through the rear ultrasonic sensor 112 and monitor the rear detection areas R1, R2, R3, and R4. When there is the obstacle in the rear detection areas R1, R2, R3, and R4, and the distance L of the obstacle is within the preset distance Lf, the DAS 100 may recognize the acceleration pedal amount and the acceleration pedal change rate are recognized from the acceleration pedal position detected through the accelerator pedal sensor 113. When the recognized acceleration pedal amount is higher than the preset pedal amount and the recognized acceleration pedal change rate is higher than the preset change rate, the DAS 100 may determine that the emergency braking is necessary and automatically brake each wheel of the vehicle 1.

As described above, in the past, the driver intended to move the parked vehicle in the forward direction, but when the accelerator pedal is pressed strongly when the gear is incorrectly moved from the P stage to the R stage instead of the D stage, sine the host vehicle 1 moves in the reverse direction rather than the intended forward direction, there is a possibility of collision with a parked rear vehicle. The DAS 100 according to the embodiment may automatically brake the host vehicle 1 even if the host vehicle 1 does not pay attention due to driving in the direction not intended by the driver, thereby preventing collision between the host vehicle 1 and the rear vehicle.

Figure 7:
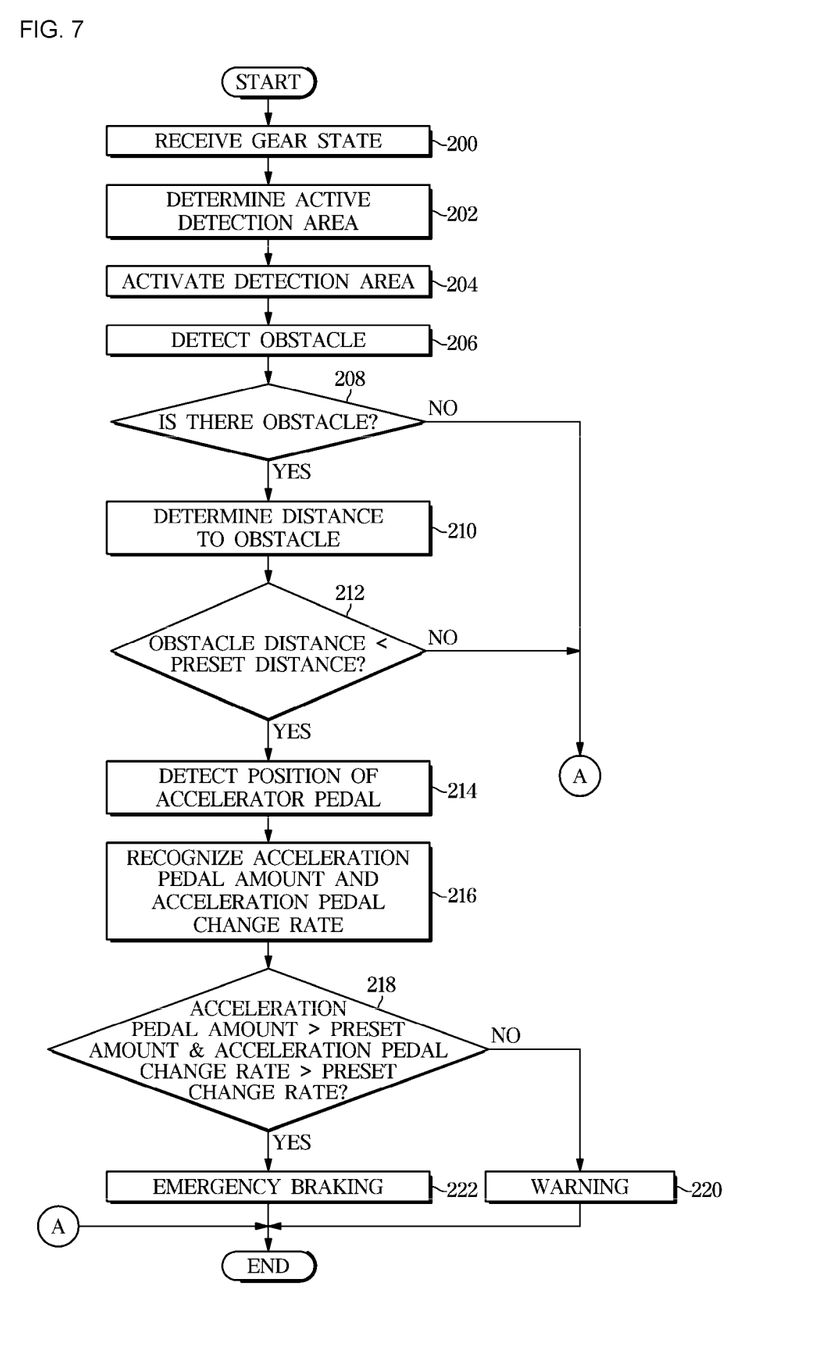
FIG. 7 is a view illustrating a driver assistance method according to an embodiment.

FIG. 7 is a view illustrating a driver assistance method according to an embodiment.

Referring to FIG. 7, the DAS 100 may receive the gear state of the shift lever from the TCU 21 using the can transceiver 121 (200).

The DAS 100 may determine an active detection area among the front detection areas F1, F2, F3, and F4 and the rear detection areas R1, R2, R3, and R4 according to the gear state (202). When the gear state is the forward gear stage, the DAS 100 may activate the front detection areas F1, F2, F3, and F4 through the front ultrasonic sensor 111. When the gear state is the reverse gear stage, the DAS 100 may activate the rear detection areas R1, R2, R3, and R4 through the rear ultrasonic sensor 112.

The DAS 100 may detect the obstacle in the activated detection area using the ultrasonic sensor corresponding to the activated detection area (204).

The DAS 100 may determine whether the obstacle exists in the activated detection area (208).

When the obstacle exists in the activated detection area, the DAS 100 may determine the distance to the obstacle (210).

The DAS 100 may determine whether the determined obstacle distance is less than the preset distance (for example, 50 cm) (212).

When the determined obstacle distance is less than the preset distance, the DAS 100 may detect the position of the accelerator pedal using the accelerator pedal sensor 113 (214).

The DAS 100 may recognize the acceleration pedal amount and the acceleration pedal change rate from the detected acceleration pedal position (216).

The DAS 100 may determine whether the recognized acceleration pedal amount exceeds the preset amount and the acceleration pedal change rate exceeds the preset change rate (218).

When the recognized acceleration pedal amount exceeds the preset amount and the acceleration pedal change rate does not exceed the preset change rate as a result of the determination in the operation mode 218, the DAS 100 may warn the driver of a risk of collision using uses a display device or an audio device in the vehicle 1 (220).

On the other hand, when the recognized acceleration pedal amount exceeds the preset amount and the acceleration pedal change rate exceeds the preset change rate as the result of the determination of the operation mode 218, the DAS 100 may emergency brake the vehicle 1 (222). The DAS 100 may transmit the message requesting braking of the vehicle 1 to the EBCM 31 using the communicator 120.

As described above, the DAS according to the embodiment may prevent the collision between the host vehicle 1 and the pedestrians and/or the obstacles even if the host vehicle 1 drives in the direction not intended by the driver due to the drivers gear manipulation mistake when starting after stopping.

Figure 8:
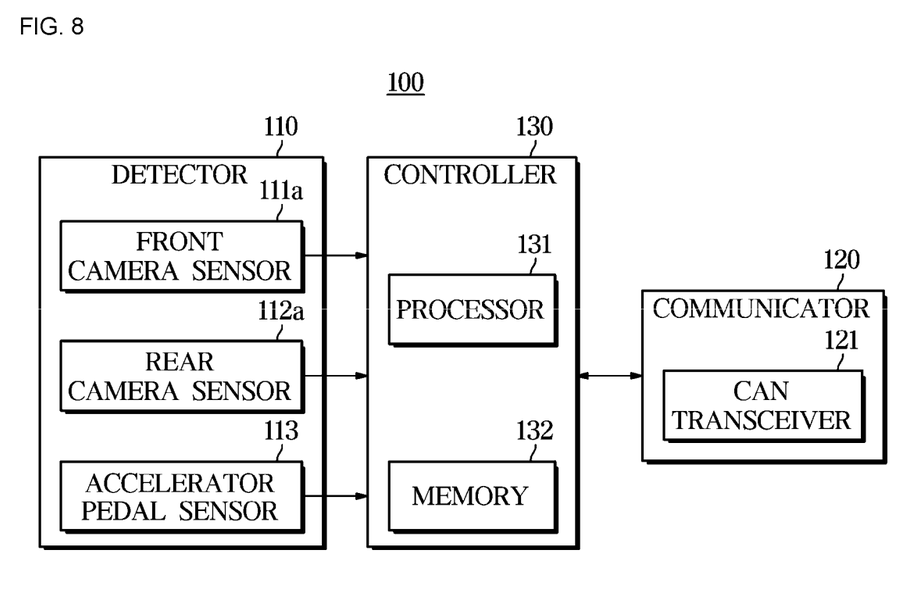
FIG. 8 is a view illustrating a configuration of a driver assistance system according to a second embodiment.

FIG. 8 is a view illustrating a configuration of a driver assistance system according to a second embodiment.

Referring to FIG. 8, the DAS 100 may include a front camera sensor 111a and a rear camera sensor 112a as image sensors instead of the front ultrasonic sensor 111 and the rear ultrasonic sensor 112 among the components of the detector 110.

The front camera sensor 111a may capture the front detection area, and the processor 131 may analyze the front detection area image captured through the front camera sensor 111a to detect the pedestrians and/or the obstacles.

The rear camera sensor 112a may capture the rear detection area, and the processor 131 may analyze the rear detection area image captured through the rear camera sensor 112a to detect the pedestrians and/or the obstacles.

Figure 9:
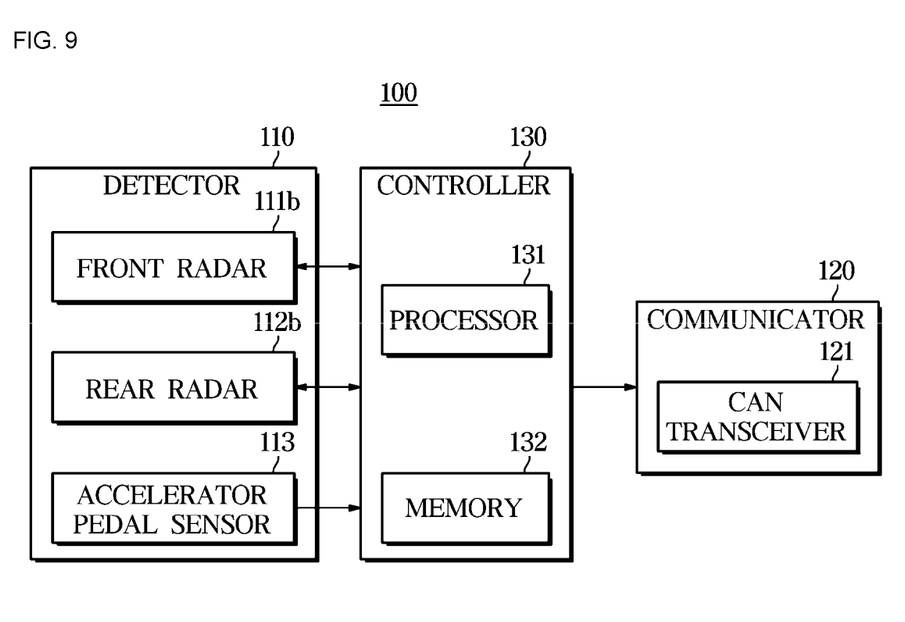
FIG. 9 is a view illustrating a configuration of a driver assistance system according to a third embodiment.

FIG. 9 is a view illustrating a configuration of a driver assistance system according to a third embodiment.

Referring to FIG. 9, the DAS 100 may include a front radar 111b and a rear radar 112b instead of the front ultrasonic sensor 111 and the rear ultrasonic sensor 112.

The front radar 111b may detect a relative position and a relative speed of the pedestrians and/or obstacles in the front detection area using radio waves, and the processor 131 may detect the distance of the pedestrians and/or the obstacles using the relative position, the relative speed, etc. of the pedestrians and/or obstacles in the front detection area detected through the front radar 111b.

The rear radar 112b may detect the relative position and the relative speed of the pedestrians and/or obstacles in the rear detection area using radio waves, and the processor 131 may detect the distance of the pedestrians and/or the obstacles using the relative position, the relative speed, etc. of the pedestrians and/or obstacles in the front detection area detected through the rear radar 112b.

Figure 10:
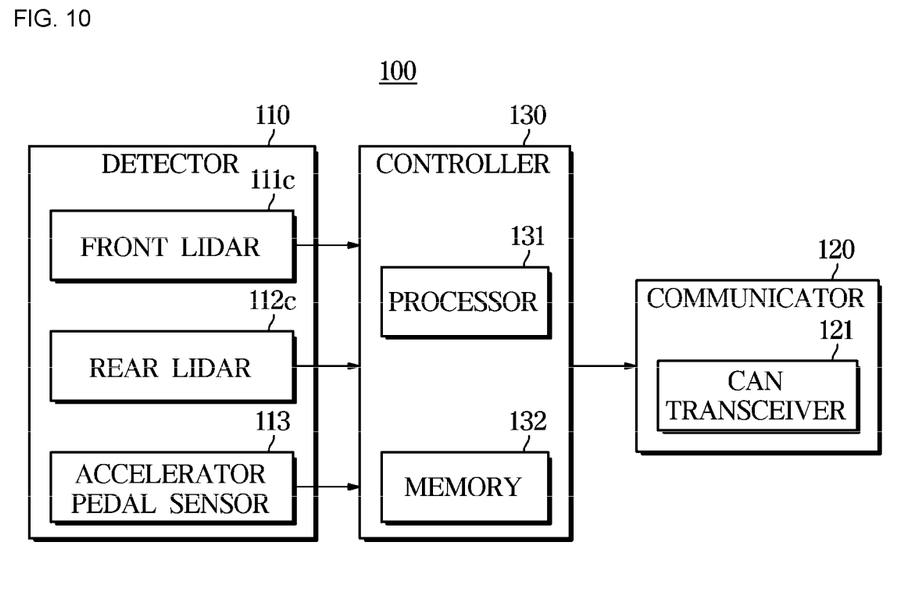
FIG. 10 is a view illustrating a configuration of a driver assistance system according to a fourth embodiment.

FIG. 10 is a view illustrating a configuration of a driver assistance system according to a fourth embodiment.

Referring to FIG. 10, the DAS 100 may include a front Light Detection And Ranging (LiDAR) sensor 111c and a rear LiDAR sensor 112c instead of the front ultrasonic sensor 111 and the rear ultrasonic sensor 112.

The front LiDAR sensor 111c may detect the distance to the pedestrians and/or obstacles in the front detection area using light, and the processor 131 may detect the distance of the pedestrians and/or obstacles in the front detection area detected through the front LiDAR sensor 111c.

The rear LiDAR sensor 112c may detect the distance to the pedestrians and/or obstacles in the rear detection area, and the processor 131 may detect the distance of the pedestrians and/or obstacles in the rear detection area detected through the rear LiDAR sensor 112c.

According to the embodiments of the disclosure, even if the host vehicle drives in the direction not intend by the driver due to the driver's gear manipulation mistake when starting after stopping, the collision between the host vehicle and the pedestrian or the obstacle can be prevented.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A driver assistance system comprising:
a detector configured to detect pedestrians or obstacles in a front detection area and a rear detection area of a vehicle;
an accelerator pedal sensor configured to detect a position of an accelerator pedal of the vehicle; and
a controller configured to selectively activate the front detection area and the rear detection area according to a gear state of the vehicle,
when there is the pedestrians or the obstacles in the activated detection area, recognize an acceleration pedal change amount from an acceleration pedal position detected through the accelerator pedal sensor,
determine whether emergency braking of the vehicle is necessary based on the recognized acceleration pedal change amount, and
when the emergency braking is necessary, perform the emergency braking for the vehicle,
wherein the controller is configured to:
when a distance between a host vehicle and the pedestrians or the obstacles existing in the activated detection area is within a preset distance, recognize an acceleration pedal amount and an acceleration pedal change rate from the acceleration pedal position detected through the accelerator pedal sensor; and
determine whether the emergency braking of the vehicle is necessary based on the recognized acceleration pedal amount and acceleration pedal change rate.

2. The driver assistance system according to claim 1, wherein, when the recognized acceleration pedal amount is higher than a preset pedal amount and the recognized acceleration pedal change rate is higher than a preset change rate, the controller is configured to determine that the emergency braking of the vehicle is necessary.

3. The driver assistance system according to claim 2, further comprising:
a communicator configured to communicate with an electronic brake control module (EBCM) of the vehicle,
wherein the controller is configured to transmit a message requesting emergency braking of the vehicle to the EBCM through the communicator.

4. The driver assistance system according to claim 1, further comprising:
a communicator configured to communicate with a transmission control unit (TCU) of the vehicle,
wherein the controller is configured to receive a gear state of a shift lever from the TCU through the communicator.

5. The driver assistance system according to claim 4, wherein the controller is configured to activate the front detection area when the gear state is a forward gear stage, and to activate the rear detection area when the gear state is a reverse gear stage.

6. The driver assistance system according to claim 1, wherein the detector comprises a front ultrasonic sensor configured to detect a distance to the pedestrians or the obstacles in the front detection area, and a rear ultrasonic sensor configured to detect a distance to the pedestrians or the obstacles in the rear detection area.

7. The driver assistance system according to claim 1, wherein the detector comprises at least one of an image sensor, a radar sensor, or a LiDAR sensor.

8. A driver assistance system comprising:
a front ultrasonic sensor configured to detect a distance to pedestrians or obstacles in a front detection area of a vehicle;
a rear ultrasonic sensor configured to detect the distance to the pedestrians or the obstacles in a rear detection area of the vehicle;
an accelerator pedal sensor configured to detect a position of an accelerator pedal of the vehicle; and
a controller configured to selectively activate the front detection area and the rear detection area according to a gear state of the vehicle,
recognize the distance of the pedestrian or the obstacle based on the distance to the pedestrian or the obstacle output from the ultrasonic sensor corresponding to the activated detection area,
when the recognized distance of the pedestrian or the obstacle is within a preset distance, recognize an acceleration pedal amount and an acceleration pedal change rate from an acceleration pedal position output from the accelerator pedal sensor,
determine whether emergency braking of the vehicle is necessary based on the recognized acceleration pedal amount and acceleration pedal change rate, and
when the emergency braking is necessary, perform the emergency braking for the vehicle.

9. The driver assistance system according to claim 8, further comprising:
a communicator configured to communicate with an electronic brake control module (EBCM) of the vehicle,
wherein the controller is configured to transmit a message requesting emergency braking of the vehicle to the EBCM through the communicator.

10. The driver assistance system according to claim 8, further comprising:
a communicator configured to communicate with a transmission control unit (TCU) of the vehicle,
wherein the controller is configured to receive a gear state of a shift lever from the TCU through the communicator.

11. A method of controlling a driver assistance system comprising:
receiving a gear state of a vehicle;
selectively activating a front detection area and a rear detection area of the vehicle according to the received gear state;

recognizing a distance of pedestrians or obstacles in the activated detection area based on at least one of ultrasonic data, image data, radar data, and LiDAR data respectively, received from at least one of an ultrasonic sensor, an image sensor, a radar sensor, or a LiDAR sensor provided in the vehicle;

determining whether the distance of the recognized pedestrians or obstacles is within a preset distance;

when the recognized distance of the pedestrians or obstacles is within the preset distance, recognizing an acceleration pedal change amount from an acceleration pedal position output from an accelerator pedal sensor provided in the vehicle;

determining whether emergency braking of the vehicle is necessary based on the recognized acceleration pedal change amount; and when the emergency braking is required, performing the emergency braking for the vehicle, wherein the controller is configured to:
when a distance between a host vehicle and the pedestrians or the obstacles existing in the activated detection area is within a preset distance, recognize an acceleration pedal amount and an acceleration pedal change rate from the acceleration pedal position detected through the accelerator pedal sensor; and determine whether the emergency braking of the vehicle is necessary based on the recognized acceleration pedal amount and acceleration pedal change rate.

12. The method according to claim 11, wherein the determining whether the emergency braking of the vehicle is necessary comprises:
when the recognized acceleration pedal amount is higher than a preset pedal amount and the recognized acceleration pedal change rate is higher than a preset change rate, determining that the emergency braking of the vehicle is necessary.

13. The method according to claim 12, wherein the selectively activating of the detection area comprises:
when the gear state is a forward gear stage, activating the front detection area; and when the gear state is a reverse gear stage, activating the rear detection area.

14. The method according to claim 11, wherein the receiving of the gear state of the vehicle comprises:
communicating with a transmission control unit (TCU) of the vehicle to receive a gear state of a shift lever from the TCU.

15. The method according to claim 11, wherein the performing of the emergency braking for the vehicle comprises:
communicating with an electronic brake control module (EBCM) of the vehicle to transmit a message requesting emergency braking of the vehicle to the EBCM.

* * * * *